United States Patent [19]
Whiddon et al.

[11] Patent Number: 5,836,702
[45] Date of Patent: Nov. 17, 1998

[54] COMPOSITE BEARING HOUSING

[75] Inventors: Richard M. Whiddon, Simpsonville; Theodore L. Hazlett, Taylors, both of S.C.

[73] Assignee: Reliance Electric Industrial Company, Cleveland, Ohio

[21] Appl. No.: 921,921

[22] Filed: Aug. 27, 1997

[51] Int. Cl.⁶ ........................................... F16C 19/28
[52] U.S. Cl. ............................... 384/584; 384/428
[58] Field of Search ................... 384/428–444, 384/537–542, 584

[56] References Cited

U.S. PATENT DOCUMENTS

| D. 343,179 | 1/1994 | Waskiewicz | D15/143 |
|---|---|---|---|
| 5,395,171 | 3/1995 | Waskiewicz | 384/428 |
| 5,433,530 | 7/1995 | Waskiewicz | 384/206 |

OTHER PUBLICATIONS

Article from The Torrington Co., Fafnir Bearings Division, "High–Performance Polymer Ball Bearing Housed Units", pages and date not known.

Article from MRC Bearing Services, "Marathon Series Composite Mounted Bearing Units", pp. 1–5, Jan. 1996.

Article from Dodge, "Sleeve Bearings", pp. 590–591, date unknown.

*Primary Examiner*—Lenard A. Footland
*Attorney, Agent, or Firm*—Patrick S. Yoder; John M. Miller; John J. Horn

[57] ABSTRACT

A composite bearing housing includes a molded plastic body in which planar reinforcing elements are embedded. The reinforcing elements may be flat or shaped, such as in frustoconical or other configurations. The plastic body is molded around the reinforcing elements and may be formed in any of a number of styles, such as pillow block styles, four-bolt flanged styles and the like. The housing includes a bearing set support surface and features for securing the housing to a machine frame. The reinforcing elements are edge-loaded to transmit loads on a bearing set to the support features and machine frame. Lateral faces of the reinforcing members contact the body material of the housing to prevent bending or buckling of the reinforcing members under loads.

13 Claims, 6 Drawing Sheets

COMPOSITE BEARING HOUSING

BACKGROUND OF THE INVENTION

1. Field of the Invention

The present invention relates generally to the field of bearings, such as ball or roller bearings for supporting one machine element in rotation with respect to another. More particularly, the invention relates to a housing for such a bearing formed of a composition of materials providing a light-weight yet sturdy structure particularly well suited to certain types of application, such as in the food processing and chemical industries.

2. Description of the Related Art

Various types and styles of bearings are known and in use for supporting one machine element, such as a shaft or sleeve, in rotation on another machine element, such as a machine frame or support. Such bearings typically include a bearing set make up of ring-like inner and outer races between which a quantity of bearing elements, generally balls or rollers, are held. The inner and outer races may rotate with respect to one another by rotation of the bearing elements. The bearing set is typically supported by a bearing housing which includes features such as bolt holes, alignment surfaces and the like, that permit the assembled bearing to be fastened to the machine frame. Once secured in place, the inner race may receive the shaft or sleeve to be held in rotation. Collars, seals and other components may be added to properly position the machine elements with respect to the bearing and to effectively insolate the bearing set from the surrounding environment.

Many conventional bearings of the type described above utilize metallic bearing housings. These may be formed by processes such as casting or forging, and later machined to provide appropriate surfaces for receiving the bearing set and any seals or other components as dictated by the particular application. Conventional housings are available in a variety of styles to accommodate a range of applications, such as pillow block or flange mounted designs, as well as more specialized styles such as take-up frame designs.

While such metal housings provide a strong, durable support structure for the bearing set and rotating member, they are not without drawbacks. For example, both cast and forged bearing housings require a number of separate machining steps to form the internal features needed to support the bearing set. Further machining steps are typically required to form other necessary features such as a lubricant flow channel through which grease is applied to the bearing set during use. Each of these operations may demand special fixturing and machine set-up, adding to the cost of the end product.

In addition to such manufacturing issues, metallic bearing housings may present other significant disadvantages in certain applications. For example, in many industrial settings, such as in the food and beverage industries, contamination resulting from metal oxidation and the like must be kept to a minimum. Maintenance personnel in such industries often periodically clean machinery, including bearings, with high pressure water or steam spray equipment to remove debris that may have accumulated during production. In other industries, such as chemical manufacturing and handling, corrosive atmospheres may accelerate corrosion of many metals. If left unprotected, conventional metal bearing housings would quickly rust or corrode requiring their removal and replacement. As a result, bearing housings for such applications may be made of special metals that resist corrosion, or conventional housings may be coated or plated to resist or delay such corrosion. However, special metal housings are often costly, and coating or plating techniques are only partially satisfactory in inhibiting corrosion.

Various forms of plastic bearing housings have also been proposed and are commercially available. While these offer improved resistance to corrosion, heretofore known plastic bearing housings have been less than satisfactory. In particular, the plastic structures are typically limited to low load applications due to the low stiffness of the material. Thus, higher loading levels may result in unacceptable deformation of the housings, reducing their capacity to support a bearing set, as well as their useful life. Moreover, while additional stiffness may be obtained through the use of certain engineering plastics, these are often quite costly.

There is a need, therefore, for an improved bearing housing that is both of relatively straightforward manufacture and that may be used in applications requiring good corrosion resistance. In particular, there is a need for a bearing housing that can be adapted to replace conventional ferritic bearing housings, providing sufficient strength and support for both the bearing set held therein and the machine element supported in rotation by the bearing set.

SUMMARY OF THE INVENTION

The present invention provided a novel bearing housing and a method for manufacturing the housing, both designed to respond to these needs. The housing is a composite structure comprising a moldable material, such as synthetic plastic, in which one or more structural reinforcements are embedded. The housing may be formed in a variety of conventional mounting styles, such as pillow blocks, two or four bolt flanged models, take-up frame models and the like. Many or all of the final features required in the housing are preferably formed during the molding process, thereby considerably reducing the number of manufacturing steps and the associated costs. In a preferred embodiment, reinforcing elements in the form of metal plates are at least partially edge loaded providing excellent structural strength, while the surrounding material provides support and resistance to bending of the reinforcing elements. The metal plates may be extended to the surface of the plastic, offering thermally and electrically conductive paths through the housing.

Each portion of the resulting composite structure is able to perform functions ideally suited to its material characteristics, optimizing stiffness and strength while reducing overall cost. The plastic body material offers superior corrosion resistance and provides lateral stiffness to prevent buckling of the reinforcing elements. The reinforcing elements offer continuous load paths between the point of load application (i.e., the bearing outer race) and the housing supports (i.e., fasteners fixed to a machine support surface), capable of resisting tensile and compressive stresses well beyond levels that the plastic body material alone would support.

Thus, in accordance with a first aspect of the invention, a housing is provided for a bearing. The bearing may be of any known type, such as a sleeve bearing, a roller bearing, a ball bearing, a needle bearing, and so forth. The housing comprises a housing body and at least one reinforcing member disposed therein. The housing body is formed of a moldable plastic material and includes an aperture bounded by a bearing set support surface. The reinforcing member is substantially planar and is edge loaded within the housing. The reinforcing member at least partially surrounding the aperture. When the bearing housing is placed in service the reinforcing member carries tensile and compressive loading exerted on the bearing.

In accordance with another aspect of the invention, a housing for a bearing includes a body and a plurality of substantially planar reinforcing members. The body is formed of a moldable plastic material, and has an aperture bounded by a bearing support surface. The body also has at least one flange for securing the housing to a machine support. The reinforcing members are disposed within the body. At least one of the reinforcing members extending intermediate the aperture and the flange to support tensile and compressive loads exerted on the housing during service.

In accordance with a further aspect of the invention, a method is provided for manufacturing a composite bearing housing. The housing is of the type including a first, central aperture for supporting a bearing, and a plurality of second apertures for receiving support fasteners. In accordance with the method, a reinforcing member is formed, such as by stamping from a metallic stock. The reinforcing member includes a pair of lateral surfaces and a pair of edge surfaces of smaller dimensions than the lateral surfaces. The reinforcing member is then positioned within a housing mold such that the lateral surfaces extend in a direction from the central aperture of the housing towards the second apertures. A moldable plastic material is introduced into the mold to cause the material to flow around the reinforcing member to at least partially embed the member within the material. The housing is then removed from the mold.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
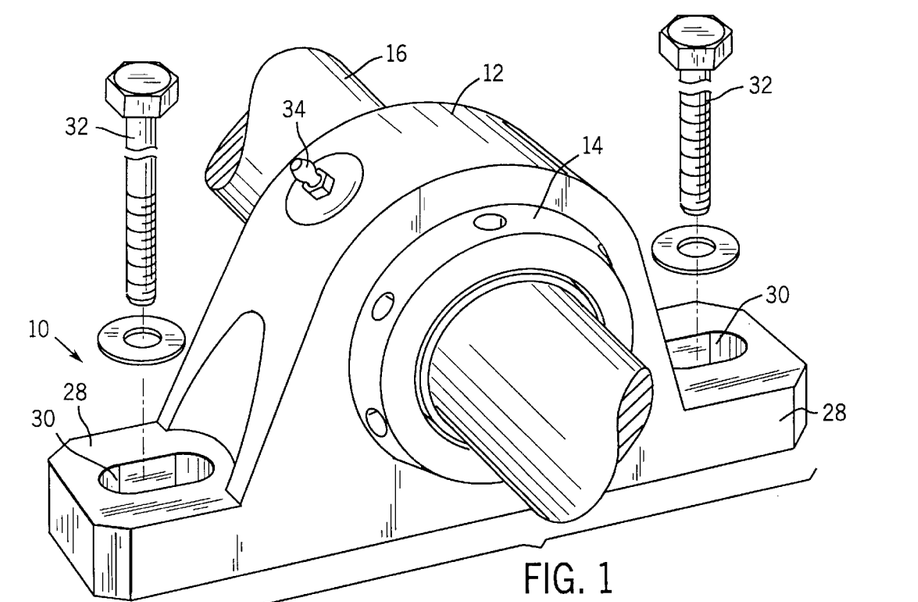
FIG. 1 is a perspective view of a pillow block bearing including a composite housing in accordance with the invention, supporting a shaft in rotation.

Turning now to the drawings, and referring first to FIG. 1, a bearing 10 is illustrated including a composite bearing housing, designated generally by the reference numeral 12. Bearing 10 includes a bearing set 14 for supporting a mechanical element 16, such as a shaft, in rotation. Bearing set 14 may be of any conventional type, such as a sleeve bearing, a roller bearing, a ball bearing, a needle bearing or the like. In the embodiment shown in FIG. 3, bearing set 14 includes an inner ring or race 18, an outer ring or race 20, and a plurality of antifriction bearing elements 22 disposed therebetween. A seal 24 is commonly included outboard of bearing elements 22 to retain lubricating grease within the bearing set and to prevent dirt and debris from entering between inner and outer races 18 and 20. A collar 26 or similar retaining element may be included to properly position rotating element 16 with respect to bearing 10.

Figures 2, 4:
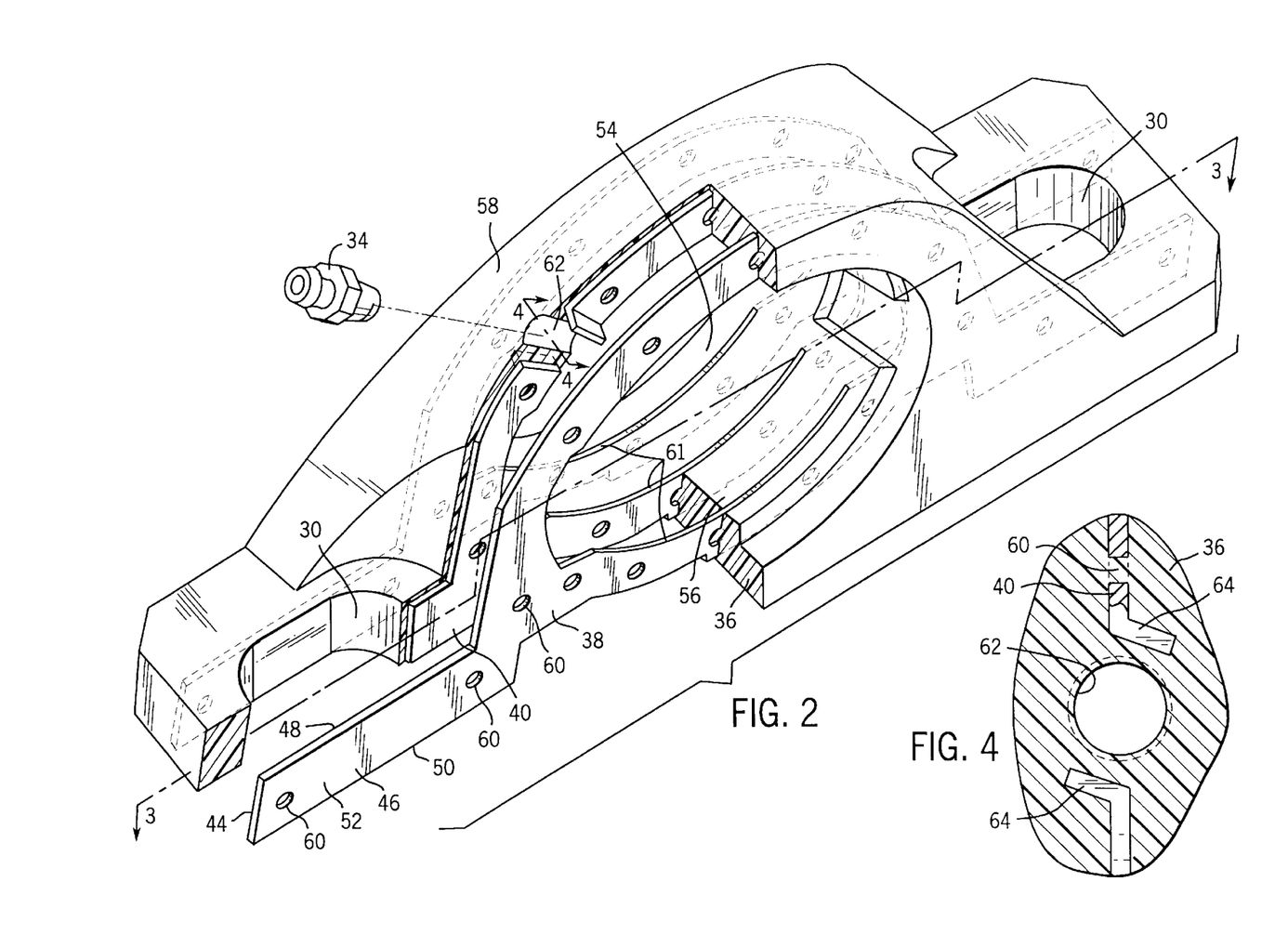
FIG. 2 is a partially cutaway perspective view of the bearing of FIG. 1, showing the placement of internal structural reinforcing elements in accordance with one preferred embodiment.
FIG. 4 is a sectional detail view of the bearing of FIG. 2, illustrating the placement of reinforcing elements in the vicinity of a lubricant injection aperture in the housing.

In the embodiment illustrated in FIGS. 1 and 2, housing 12 is formed as a pillow block support, including a pair of lateral flanges 28 traversed by apertures or bolt holes 30. Apertures 30 serve to receive fasteners 32 for securing housing 12 to a machine support surface (not illustrated). A lubricant fitting 34 is secured to housing 12 in fluid communication with bearing set 14. Lubricant fitting 34 permits lubricant to be injected into bearing set 14 in a manner well known in the art.

Figure 3:
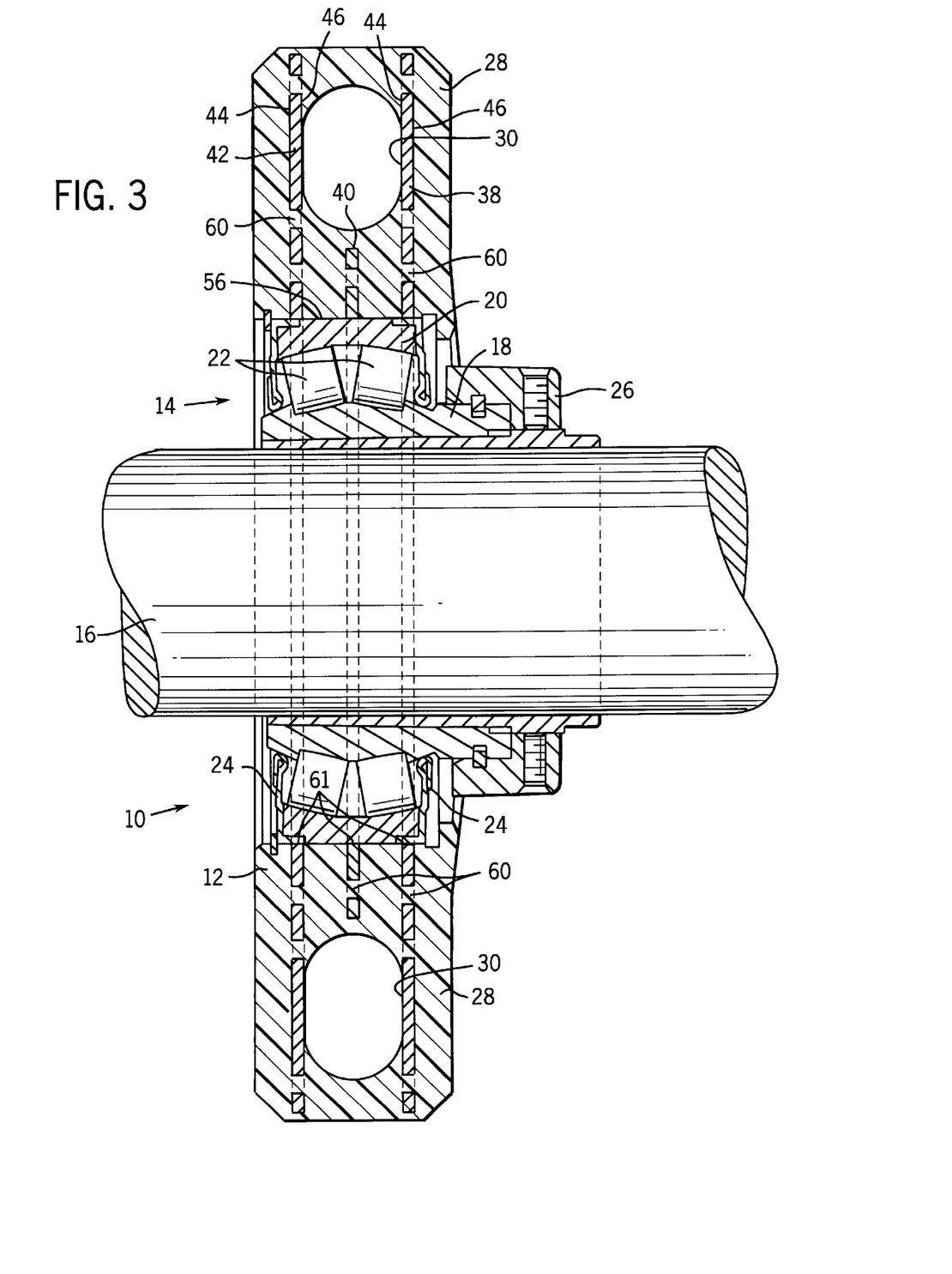
FIG. 3 is a sectional view of the bearing of FIG. 2 along line 3—3, illustrating the positions of the reinforcing elements in the housing.
Figure 5:
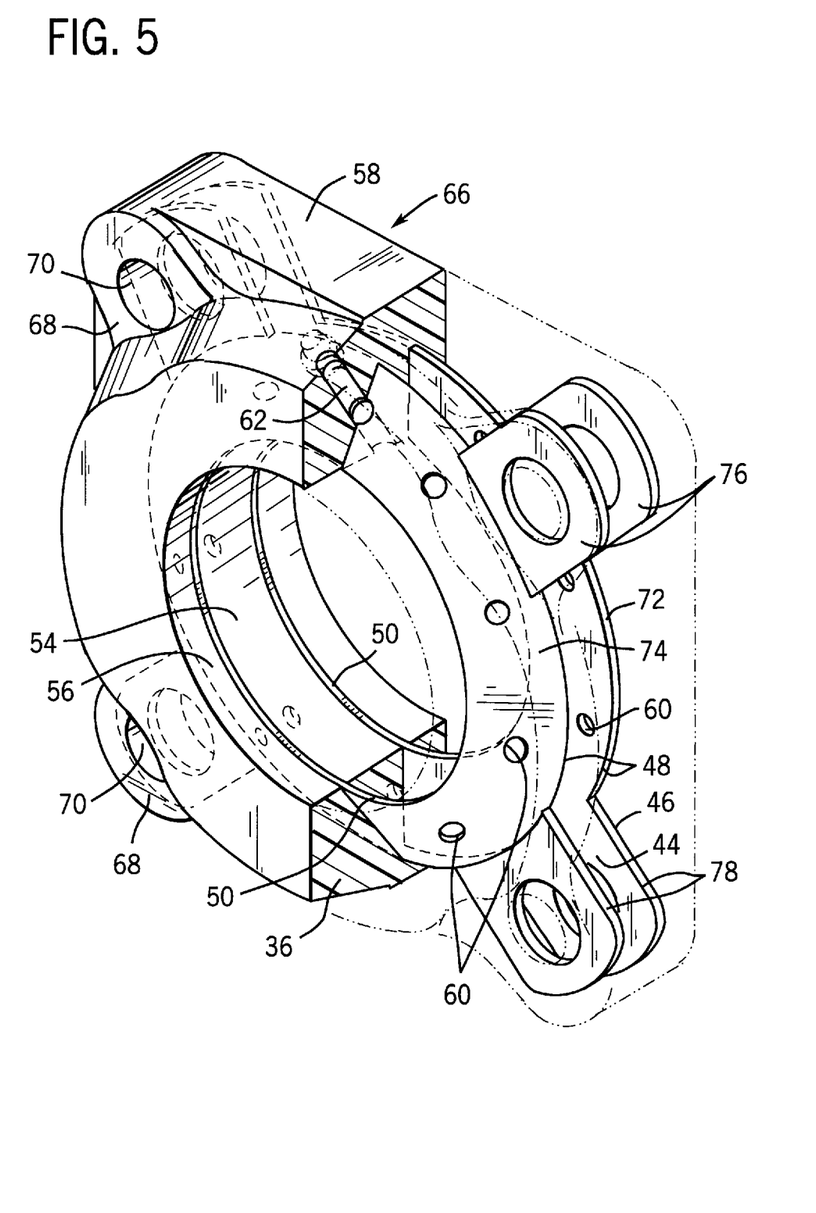
FIG. 5 is a partially cutaway view of a flanged bearing housing illustrating an exemplary embodiment of reinforcing members disposed within the body of a housing of this type.
Figure 7:
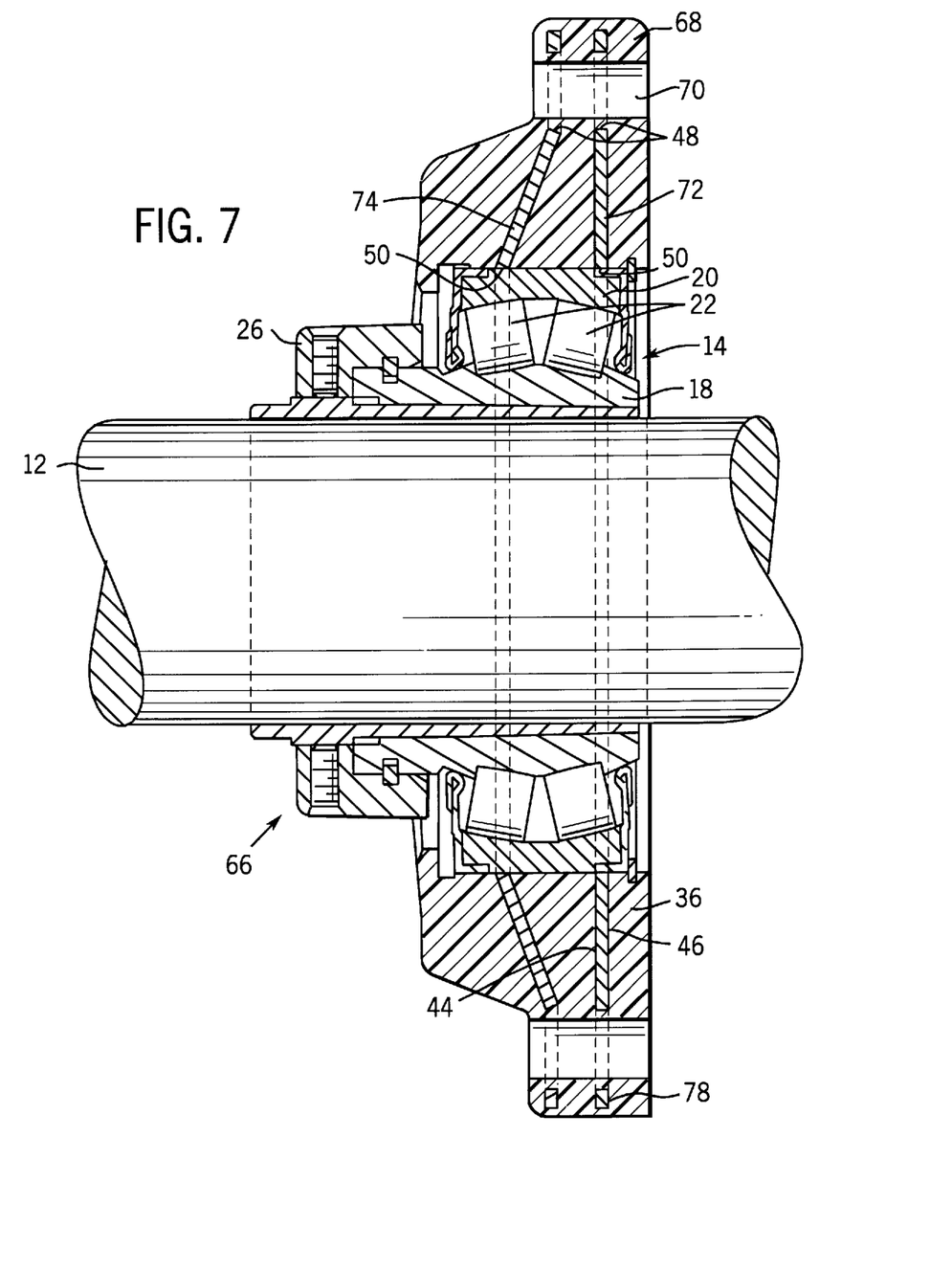
FIG. 7 is a sectional view of the bearing of FIG. 5 illustrating exemplary placement of reinforcing elements within the composite housing structure.

Referring more specifically to FIGS. 2 and 3, bearing housing 12 is formed as a composite structure including a molded body 36 in which a plurality of substantially planar reinforcing members 38, 40 and 42 are disposed. It should be noted that for the purposes of the present disclosure, the term "planar" is intended to extend various configurations having lateral faces 44 and 46 extending between edges 48 and 50, when viewed in cross section. Thus, members 38, 40 and 42 may be generally flat, as illustrated in FIGS. 2 and 3, or may have other shapes, such as frustoconical, as shown in FIGS. 5 and 7 and described below. Moreover, numerous variations of the basic shape described herein may be envisioned by those skilled in the art, such as corrugated, undulating, stepped and so forth. All such structures are intended to be described by the term "planar" to the extent permissible by the appended claims.

Housing 12 is configured to support and transmit loading of bearing set 14 via reinforcing members 38, 40 and 42, to the machine surface or frame on which bearing 10 is secured via reinforcing members 38, 40 and 42. Thus, as shown in FIGS. 2 and 3, at least one of the reinforcing members (see members 38 and 42) preferably includes support extensions 52 within flanges 28, adjacent to fastener apertures 30. Moreover, housing 12 forms a central aperture or opening 54 bounded by a bearing set support surface 56 for accepting loads on bearing set 14. At least one of the reinforcing members 38, 40 and 42 extends around central aperture 54. Reinforcing members 38, 40, 42 thus extend around support surface 56 and between support surface 56, and flanges 28.

In a preferred embodiment illustrated, body 36 of housing 12 has an outer surface 58 and reinforcing members 38, 40 and 42 are disposed within body 36 so as to extend to locations just below outer surface 58. At least one of the reinforcing members may extend to the level of bearing support surface 56 to expose an edge 61 generally flush with support surface 56 (see FIG. 2). Moreover, in the pillow block embodiment illustrated in FIGS. 2 and 3, a pair of the reinforcing members, 38 and 42 bound apertures 30 of mounting flanges 28. In this preferred arrangement, the reinforcing members provide thermal and electrically conductive paths between bearing support surface 56 and the machine surface on which housing 12 is mounted. Additionally, members 38 and 42 provide substantial resistance to crushing by fasteners 32. Alternatively, all reinforcing members 38, 40 and 42 may be entirely embedded within housing 12 so as to completely insolate the members from the environment in which housing 12 is mounted.

Housing body 36 is preferably formed of a moldable, thermosetting or thermoplastic material. Reinforcing members 38, 40 and 42 are preferably made of a stiff metal, such as 0.03 inch thick mild steel. Other thicknesses of material stock and stronger materials, such as high strength steels, may be used where higher loads are anticipated in particular applications. To permit the material to flow around and between members 38, 40 and 42 material flow apertures 60 are formed in the members between lateral faces 44 and 46.

Housing 12 is preferably formed as follows. Reinforcing members 38, 40 and 42 are preformed, such as by stamping from a steel sheet stock. Subsequent forming operations may be performed, such as breaking or bending to form desired internal or profile features (such as lubrication fitting support flanges 64 described below). The reinforcing members are then placed in a die or mold and retained securely in desired positions by standoffs or the like, in a manner generally known to those in the molding arts. A moldable plastic material is then injected into the mold and forced, under pressure, to flow around members 38, 40 and 42, and through apertures 60, embedding the members in the injected molded plastic material. As will be appreciated by those skilled in the art, where a thermoset material is employed, the particular molding procedure will be adapted to the material, such as by replacing forced injection with pouring of the fluid material into the mold. The material is permitted to cure and the completed housing is removed from the die. Some or all of the internal and external shapes and features of housing 12 may be formed by the contour of the mold die in a manner known in the molding art. Moreover, inserts and cores are preferably employed to form central aperture 54, and a lubrication fitting aperture 62 (see FIG. 2). Following the molding operation, additional features, such as grooves defining bearing support surface 56, may be formed or refined on housing 12 by machining operations such as turning or milling.

The composite structure of bearing housing 12 described above offers several advantages over conventional metallic or plastic housings. In particular, the composite structure affords greater strength and support for loads transmitted to bearing set 14 than is offered by conventional plastic bearing housings. Stresses, including tensile, compressive and hoop stresses on housing body 36 are supported primarily by reinforcing members 38, 40 and 42, and are transmitted by the reinforcing members from bearing support surface 56 to support flanges 28. Moreover, the reinforcing members are positioned within body 36 such that the members are primarily edge-loaded, resulting in a high moment of inertia and added stiffness. Buckling and bending of the reinforcing members under loading is effectively resisted by the plastic body material surrounding lateral faces 44 and 46. The resulting structure has a very high strength, particularly in relation to its weight, and benefits from the inherent resistance of the plastic body material to corrosion. Finally, where the reinforcing members are provided flush with bearing support surface 56 and contact either fasteners 32 or another conductive element of the machine system, heat and static charges may be freely conducted between the bearing and the machine support on which the housing is mounted.

As shown in FIG. 4, interruptions may be formed in one or more of the reinforcing members to accommodate elements of bearing 10. FIG. 4 shows an interruption of this type formed in central reinforcing member 40 in the vicinity of lubrication fitting aperture 62. In particular, because in the illustrated embodiment aperture 62 is located approximately in the middle of housing 12, reinforcing member 40 is sheared and turned back to form flanges 64 bounding aperture 62. It should also be noted that, while in the illustrated embodiment aperture 62 is provided with straight side walls that are subsequently threaded during insertion of fitting 34, a threaded sleeve or bushing may alternatively be positioned within aperture 62 during molding of housing 12.

Figure 6:
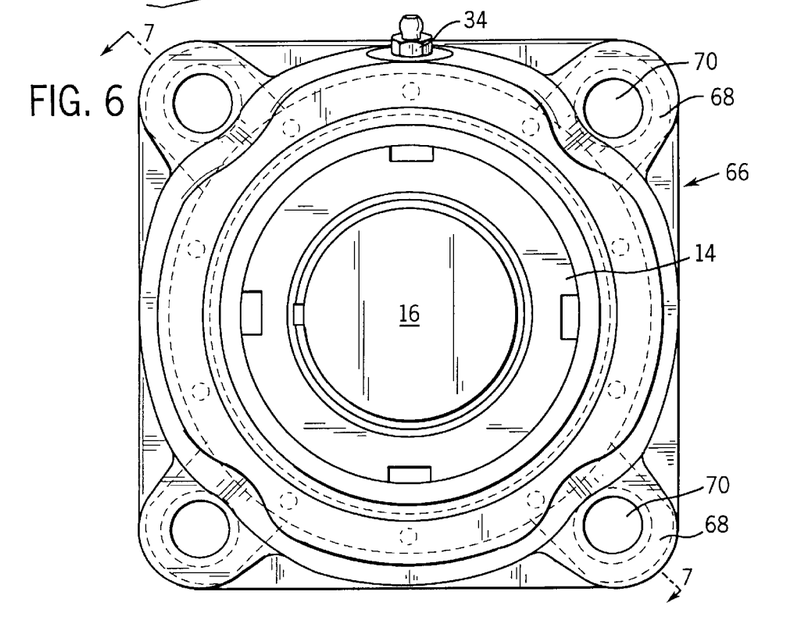
FIG. 6 is a front elevational view of a flange mounted bearing including the housing illustrated in FIG. 5.

The composite housing structure described above may be adapted to various bearing housing styles, including flanged styles and take-up frame styles. FIGS. 5–8 illustrate an exemplary embodiment of a four-bolt flanged housing 66 constructed with embedded planar reinforcing elements. As shown in FIG. 5, housing 66 includes four flange extensions 68 through which apertures 70 are formed for receiving fasteners (not shown) in a manner generally known in the art. A flat reinforcing member 72 is embedded in the base region of housing 66, while a frustoconical reinforcing member 74 extends from an outboard side of the housing toward flange extensions 68. To provide additional support for flange extensions 68, reinforcing members 72 and 74 have tab-like extensions 76 and 78 protruding into flange extensions 68 and around fastener apertures 70. As in the pillow block embodiment, reinforcing members 72 and 74 have material flow apertures 60 to allow for the free flow of the material of body 36 around and through members 72 and 74. Members 72 and 74 also have lateral faces 44 and 46, and edges 48 and 50, and are disposed within housing 66 so as to be primarily edge loaded when placed in service. FIGS. 6 and 7 illustrate housing 66 in service, with a bearing set 14 fitted within the housing and a shaft 16 secured within the bearing set. Loads on shaft 16 are thus supported by bearing set 14 and are thereby transmitted toward flanges 68 via reinforcing members 72 and 74. As described above, body 36 contacts lateral faces 44 and 46 of members 72 and 74 to prevent their bending or buckling under load.

Figure 8:
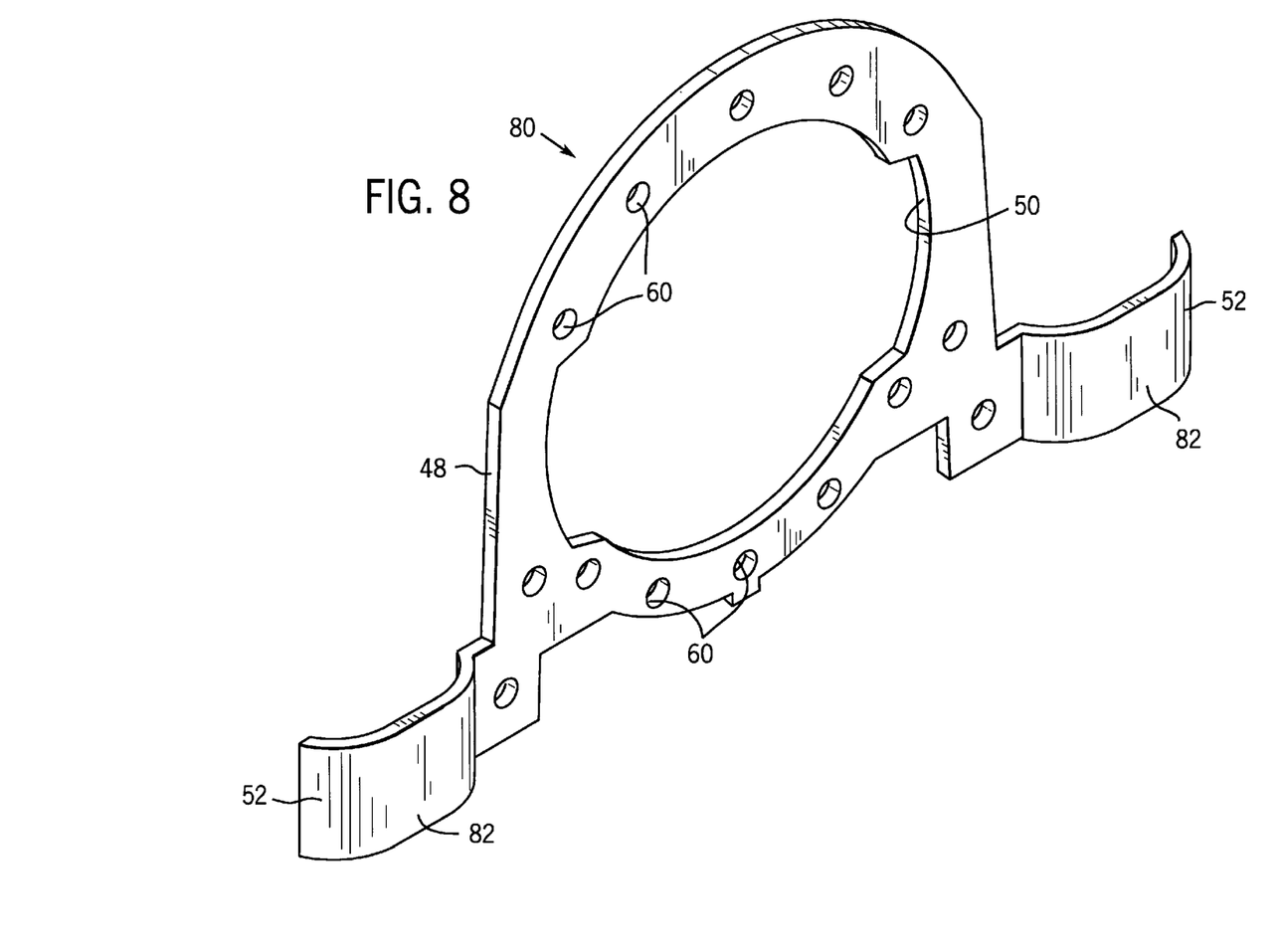
FIG. 8 is a perspective view of an alternative configuration for a reinforcing member of the type used in the pillow block housing of FIGS. 1—4.

FIG. 8 represents an alternative configuration of a reinforcing member 80 including integral stays 82 for partially surrounding fastener apertures 30. In the embodiment of FIG. 8, stays 82 are bent to conform to apertures 30 of the pillow block housing configuration. In use, two mutually facing members 80 would be placed in close proximity within housing 12 to provide additional load transfer capacity. As a further alternative, mating members 80 may be secured to one another to provide a support structure completely surrounding the fastener apertures. Moreover, the particular form of member 80 and of stays 82 may be adapted to other housing styles, such as two and four-bolt flanged housings.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A housing for a bearing set, the housing comprising:
   a housing body formed of a moldable plastic material, the body including an aperture bounded by a bearing set support surface; and
   at least one substantially planar, edge loaded reinforcing member disposed at least partially within the body, the reinforcing member at least partially surrounding the aperture, wherein when the bearing housing is placed in service the reinforcing member carries tensile and compressive loading exerted in the bearing set.

2. The bearing housing of claim 1, wherein the reinforcing member includes a pair of lateral surfaces and a pair of edge surfaces of smaller dimensions than the lateral surfaces, and wherein the body contacts the lateral surfaces to provide support thereto during loading of the housing.

3. The bearing housing of claim 2, wherein a plurality of reinforcing members are disposed substantially parallel to one another within the body.

4. The bearing housing of claim 1, wherein the reinforcing member is a metallic element embedded within the body.

5. The bearing housing of claim 4, wherein the reinforcing member extends to a surface-of the body.

6. The bearing housing of claim 1, wherein the reinforcing member completely surrounds the aperture.

7. The bearing housing of claim 1, wherein the body includes at least one mounting flange disposed adjacent to the aperture for securing the housing to a machine support, and wherein the reinforcing member includes a pair of lateral surfaces and a pair of edge surfaces of smaller dimensions than the lateral surfaces, the reinforcing member being disposed within the body such that the lateral surfaces extend from a location adjacent to the aperture to a location adjacent to the flange whereby tensile and compressive loading of the housing is supported substantially in the direction of the lateral surfaces.

8. A housing for a bearing, the housing comprising:

a body formed of a moldable plastic material, the body including an aperture bounded by a bearing support surface, and at least one flange for securing the housing to a machine support; and a plurality of substantially planar reinforcing members disposed within the body, at least one of the reinforcing members extending intermediate the aperture and the flange to support loads exerted on the housing during service.

9. The bearing housing of claim 8, wherein at least one of the reinforcing members completely surrounds the aperture.

10. The bearing housing of claim 8, wherein at least one of the reinforcing members extends to a surface of the body.

11. The bearing housing of claim 8, wherein the reinforcing members are substantially planar metallic elements.

12. The bearing housing of claim 8, wherein each reinforcing member has a pair of lateral surfaces and a pair of edge surfaces of smaller dimensions than the lateral surfaces, and wherein the reinforcing members are disposed within the body such that the lateral surfaces extend in a direction from the aperture toward the flange.

13. The bearing housing of claim 8, wherein the body includes a lubricant injection aperture extending from an outer surface thereof to the bearing support surface.

\* \* \* \* \*